United States Patent
Nishide et al.

(10) Patent No.: US 9,796,302 B2
(45) Date of Patent: Oct. 24, 2017

(54) SEAT FOR VEHICLES

(71) Applicant: HONDA MOTOR CO., LTD, Tokyo (JP)

(72) Inventors: Harutomi Nishide, Wako (JP); Yuji Arata, Wako (JP); Hiromitsu Nagatomo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/931,115

(22) Filed: Nov. 3, 2015

(65) Prior Publication Data

US 2016/0121761 A1    May 5, 2016

(30) Foreign Application Priority Data

Nov. 4, 2014  (JP) .................................. 2014-224273

(51) Int. Cl.
*B60N 2/26*    (2006.01)
*B60N 2/22*    (2006.01)
(Continued)

(52) U.S. Cl.
CPC .............. *B60N 2/2222* (2013.01); *B60N 2/20* (2013.01); *B60N 2/22* (2013.01); *A47C 1/027* (2013.01);
(Continued)

(58) Field of Classification Search
CPC .............. B60N 2/42709; B60N 2/4228; B60N 2/4838; B60N 2/26; A47C 7/02;
(Continued)

(56) References Cited

U.S. PATENT DOCUMENTS 5,120,109 A * 6/1992 Rangoni .............. B60N 2/1803
                                                  297/284.3
5,772,281 A * 6/1998 Massara ............... B60N 2/4415
                                                  297/284.4
(Continued)

FOREIGN PATENT DOCUMENTS

IT    EP 0458000 A1 * 11/1991 ............... B60N 2/66
JP    60-121853 U    8/1985
(Continued)

OTHER PUBLICATIONS

Office Action dated Jul. 8, 2016, issued in counterpart Japanese Application No. 2014-224273, with English translation. (6 pages).
(Continued)

*Primary Examiner* — Syed A Islam
(74) *Attorney, Agent, or Firm* — Westerman, Hattori, Daniels & Adrian, LLP

(57) ABSTRACT

A seat for vehicles includes: a seat back frame; and a pressure receiving member that is mounted on the seat back frame to support a back of an occupant. The seat back frame includes a lower seat back frame and an upper seat back frame mounted on an upper portion of the lower seat back frame in a forwardly and rearwardly swingable manner, and the pressure receiving member is disposed from an area corresponding to the shoulder of an occupant to an area corresponding to the waist of the occupant and is supported by the upper seat back frame.

12 Claims, 8 Drawing Sheets

(51) Int. Cl.
*B60N 2/20* (2006.01)
*A47C 1/027* (2006.01)
*A47C 7/40* (2006.01)
*A61G 15/12* (2006.01)
*B60R 21/207* (2006.01)
*A47C 7/02* (2006.01)
*A47C 3/04* (2006.01)
*B60N 2/42* (2006.01)
*B60N 2/48* (2006.01)
*B60N 2/427* (2006.01)
*A47C 31/11* (2006.01)
*B60N 2/02* (2006.01)

(52) U.S. Cl.
CPC ...... *A47C 3/04* (2013.01); *A47C 7/02* (2013.01); *A47C 7/024* (2013.01); *A47C 7/40* (2013.01); *A47C 7/405* (2013.01); *A47C 31/11* (2013.01); *A61G 15/125* (2013.01); *B60N 2/203* (2013.01); *B60N 2/26* (2013.01); *B60N 2/4228* (2013.01); *B60N 2/42709* (2013.01); *B60N 2/4838* (2013.01); *B60N 2002/0236* (2013.01); *B60R 21/207* (2013.01)

(58) Field of Classification Search
CPC ......... A47C 31/11; A47C 3/04; A47C 7/0247; A47C 7/405; A47C 1/027; A47C 7/40; A61G 15/125
USPC ............... 297/284.3, 284.1, 284.2, 284.4
See application file for complete search history.

(56) References Cited

U.S. PATENT DOCUMENTS

| | | | | |
|---|---|---|---|---|
| 6,398,299 B1 * | 6/2002 | Angerer | ............... | B60N 2/4808 297/216.12 |
| 7,963,599 B2 * | 6/2011 | Omori | ................. | B60N 2/4885 297/216.12 |
| 8,235,467 B2 * | 8/2012 | Akutsu | ................ | B60N 2/4885 297/284.4 |
| 8,313,140 B2 * | 11/2012 | Niitsuma | ............. | B60N 2/4885 297/216.12 |
| 8,632,126 B2 * | 1/2014 | Nitsuma | ............. | B60N 2/4228 297/216.13 |
| 8,678,494 B2 * | 3/2014 | Nitsuma | ............. | B60N 2/4228 297/216.12 |
| 2010/0201167 A1 * | 8/2010 | Wieclawski | ......... | B60N 2/4885 297/216.13 |
| 2011/0241394 A1 | 10/2011 | Yamaguchi et al. | | |

FOREIGN PATENT DOCUMENTS

| | | |
|---|---|---|
| JP | 64-31087 A | 2/1989 |
| JP | 2000-236985 A | 9/2000 |
| JP | 2011-207442 A | 10/2011 |
| JP | 2014-8843 A | 1/2014 |

OTHER PUBLICATIONS

Office Action dated May 19, 2017, issued in counterpart Chinese Application No. 201510673577.3, with English translation (8 pages).

* cited by examiner

SEAT FOR VEHICLES

CROSS REFERENCES TO RELATED APPLICATIONS

The present application claims priority under 35 U.S.C. §119 to Japanese Patent Application No. 2014-224273, filed Nov. 4, 2014, entitled "Seat for Vehicles." The contents of this application are incorporated herein by reference in their entirety.

BACKGROUND

1. Field

The present disclosure relates to an improved seat for vehicles.

2. Description of the Related Art

In the seat back of a seat for vehicles, a seat back frame, which forms the framework of the seat back, is provided with a cushion material, which is further covered by an outer layer. In addition, some seat back frames are equipped with a pressure receiving member for supporting the back of an occupant. The technology disclosed in Japanese Unexamined Patent Application Publication No. 2000-236985 provides a seat for vehicles in which the pressure receiving member is mounted on the seat back frame.

In the seat back frame provided in Japanese Unexamined Patent Application Publication No. 2000-235985, a rectangular shaped pressure receiving member is mounted on both sides of the seat back frame via a coil spring. A cushion material is provided in front of the pressure receiving member, and the pressure receiving member supports the back of an occupant along with the cushion material.

Here, a known seat back of a seat for vehicles has a configuration in which the upper portion of the seat back is swingable forwardly and rearwardly according to the body shape of an occupant. For instance, the seat back frame includes a lower seat back frame and an upper seat back frame that is mounted on an upper portion of the lower seat back frame in a forwardly and rearwardly swingable manner.

When the upper seat back frame is swung forwardly in such a swingable seat back, only the upper seat back frame may be displaced and the pressure receiving member may not be sufficiently displaced. In this case, the distance from the back of the occupant to the pressure receiving member is increased. When the distance is excessively increased, the effect of the pressure receiving member is decreased and comfort of the occupant sitting on a seat for vehicles is reduced.

SUMMARY

The present disclosure aims to provide a seat for vehicles that is highly comfortable for a seated occupant.

A first aspect of the disclosure provides a seat for vehicles including: a seat back frame and a shoulder and back supporting member (a pressure receiving member) that is mounted on the seat back frame to support the back of an occupant. The seat back frame includes a lower seat back frame and an upper seat back frame mounted on an upper portion of the lower seat back frame in a forwardly and rearwardly swingable manner, and the shoulder and back supporting member is disposed from an area corresponding to the shoulder of an occupant to an area corresponding to the waist of the occupant and is supported by the upper seat back frame. In other words, the shoulder and back supporting member is supported by the upper seat back frame that is mounted in a swingable manner. Therefore, the shoulder and back supporting member is displaced in coordination with swinging of the upper seat back frame. When the upper seat back frame is swung forwardly, in the shoulder and back supporting member, the area corresponding to the shoulder of an occupant is located closer to the back of the occupant. Even when the upper seat back frame is swung, the shoulder pressure receiving portion is capable of supporting the shoulder and surrounding of the occupant. Consequently, comfort of the occupant sitting on the seat for vehicles is enhanced.

In a second aspect of the disclosure, preferably, in the shoulder and back supporting member, the flexural rigidity of an area corresponding to the shoulder is lower than the flexural rigidity of an area corresponding to the waist. The area of the shoulder and back supporting member corresponding to the shoulder is likely to be bent. Therefore, the shoulder and back supporting member is likely to be operated in coordination with swinging of the upper seat back frame.

In a third aspect of the disclosure, preferably, in the area corresponding to the shoulder, a notch-shaped portion is formed in which a part between areas corresponding to right and left shoulder blades is cut out. The formation of the notch-shaped portion reduces the rigidity of the area corresponding to the shoulder and coordinated operation of the shoulder and back supporting member with the upper seat back frame is increased. In addition, the shoulder and back supporting member is capable of supporting the shoulder blades which are hard areas in the back of an occupant. The support of the hard areas allows the back of an occupant to be stably supported.

In a fourth aspect of the disclosure, preferably, the seat for vehicles further includes a holding portion that is supported by the lower seat back frame and is located in rear of the shoulder and back supporting member. The rear surface of the shoulder and back supporting member is in contact with the holding portion. The shoulder and back supporting member is supported by the lower seat back frame via the holding portion. Therefore, the area of the shoulder and back supporting member corresponding to the waist is capable of supporting the back of an occupant. In addition, the rear surface of the shoulder and back supporting member is in contact with the holding portion as described above. In other words, the shoulder and back supporting member is not fixed to the holding portion. Therefore, movement of the shoulder and back supporting member in a vertical direction is not limited. Consequently, when the upper seat back frame is swung, the shoulder and back supporting member can be operated smoothly in coordination with the upper seat back frame. Therefore, the shoulder and back supporting member achieves both support power in the area corresponding to the waist and coordinated operation with the upper seat back.

DESCRIPTION OF THE PREFERRED EMBODIMENTS

Figure 1:
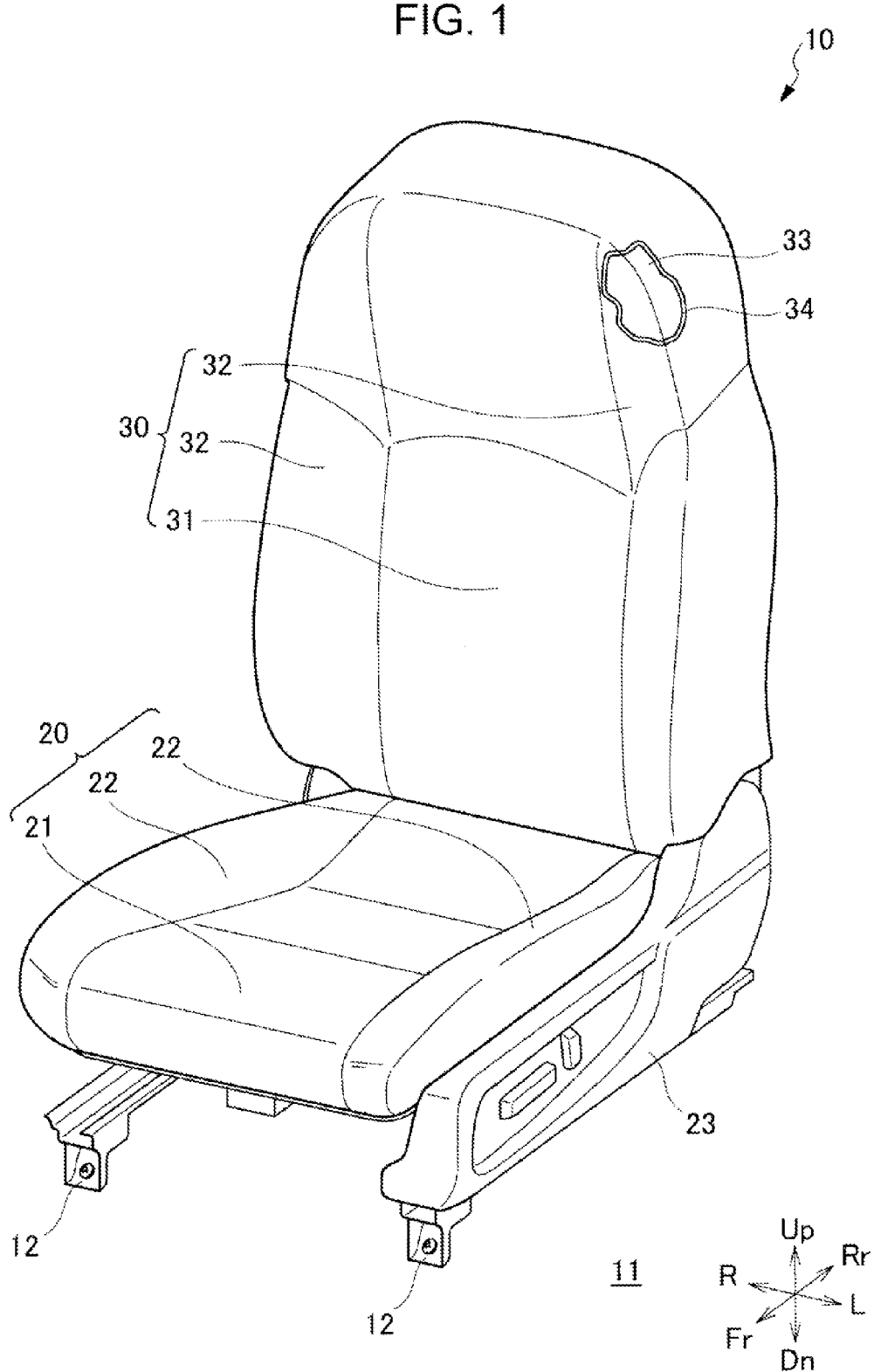
FIG. 1 is a perspective view of a seat for vehicles according to a first embodiment of the present disclosure.

An embodiment of the present disclosure will be described with reference to the accompanying drawings in the following. It is to be noted that in the following description, the right and left indicates the right and left directions with respect to an occupant of a vehicle and the front and rear indicates the front and rear directions with respect to the direction of movement of the vehicle. Also, in the drawings, Fr indicates the front, Rr indicates the rear, L indicates the left as viewed from the occupant, P indicates the right as viewed from the occupant, Up indicates the upward, and Dn indicates the downward.

First Embodiment

In FIG. 1, a seat for vehicles is illustrated. A seat for vehicles 10 includes the right and left rails 12, 12 mounted on a floor portion 11 via leg portions, a seat cushion 20 that is slidably supported in a front-rear direction on the right and left rails 12, 12, and a seat back 30 that stands upright from the rear end of the seat cushion 20.

The seat cushion 20 includes a seat portion 21 on which an occupant sits and right and left cushion portion side supports 22, 22 that expand upward from both right and left ends of the seat portion 21. A resin side cover 23, which covers part of the seat cushion 20 and the left rail 12, is provided on the left side of the seat cushion 20.

The seat back 30 includes a back reclining portion 31 that supports the back of an occupant, and right and left back portion side supports 32, 32 that bulge forward from both right and left ends of the back reclining portion 31. In the seat back 30, the surface of sponge-like cushion material 33 is covered by an outer layer 34.

Figure 2:
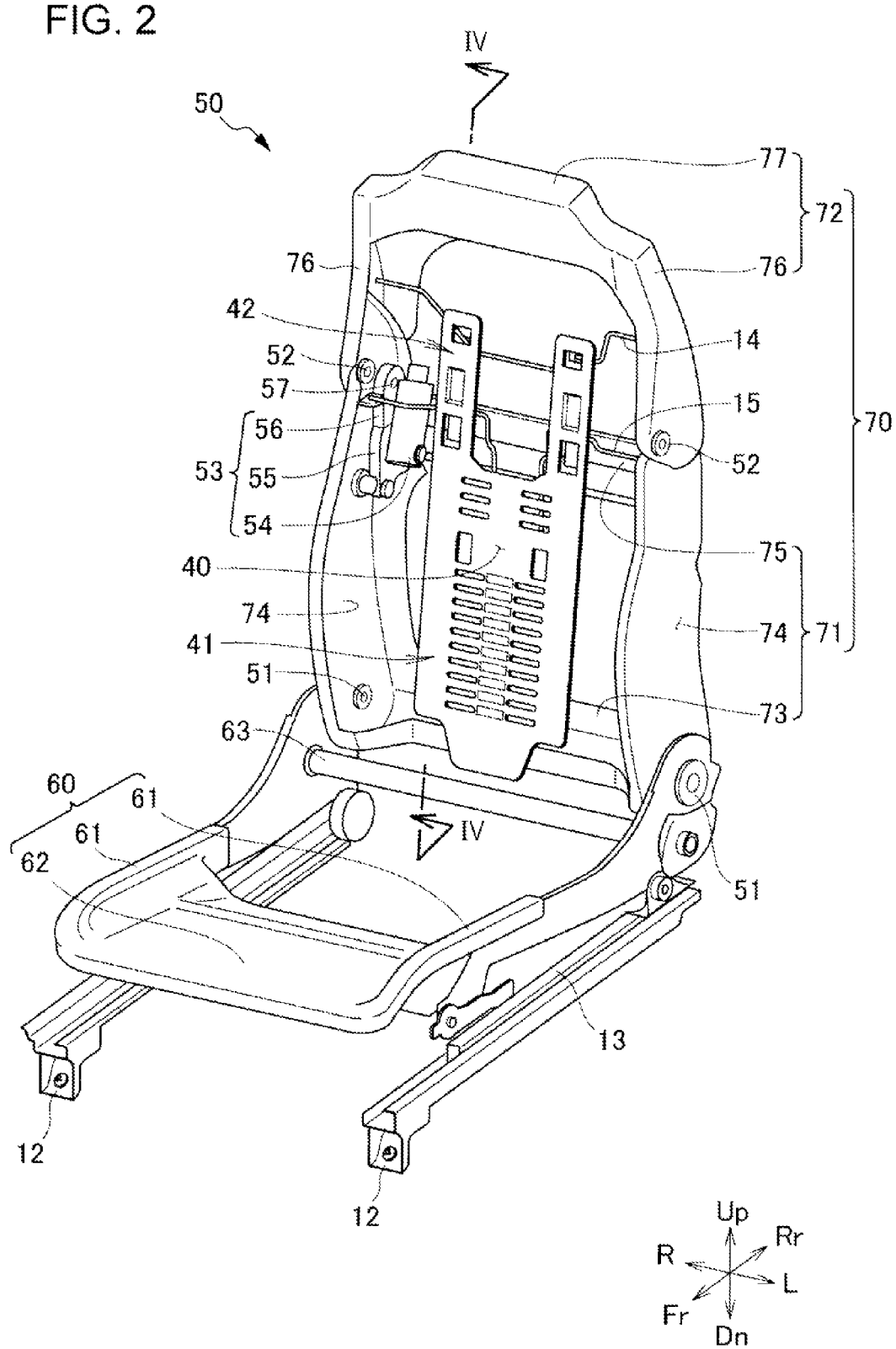
FIG. 2 is a perspective view of a seat frame and a shoulder and back supporting member of the seat for vehicles illustrated in FIG. 1.

FIG. 2 is referred. FIG. 2 illustrates a seat frame 50 to which a shoulder and back supporting member 40 for supporting the back of an occupant is mounted along with the cushion material 33 (see FIG. 1). The seat frame 50 includes a seat cushion frame 60 supported on the right and left rails 12, 12 extending in a front-rear direction via sliders 13 (only left slider 13 is illustrated), and a seat back frame 70 mounted on the seat cushion frame 60.

The seat back frame 70 is mounted on the rear end of the seat cushion frame 60 in a forwardly and rearwardly swingable manner around right and left first shaft members 51, 51.

The seat cushion frame 60 includes seat cushion frame side portions 61, 61 that extend forwardly and rearwardly along the right and left sliders 13, and seat cushion frame front portion 62 that extends from the front ends of the seat cushion frame side portions 61, 61 to the center of the seat width. A cylindrical shaped connection portion 63 is bridged between the rear ends of the right and left seat cushion frame side portions 61, 61.

The seat back frame 70 includes a lower seat back frame 71 (hereinafter referred to as a lower frame 71) that forms the lower framework of the seat back 30 (see FIG. 1), and an upper seat back frame 72 (hereinafter referred to as an upper frame 72) that is mounted on an upper portion of the lower frame 71 and that forms the upper framework of the seat back 30.

The upper frame 72 is mounted on the upper end of the lower frame 71 in a forwardly and rearwardly swingable manner around right and left second shaft members 52, 52. The upper frame 72 is swingable by an occupant according to the body shape of the occupant. The upper frame 72 is forwardly and rearwardly swingable around the right and left second shaft members 52, 52. A driver 53, which causes the upper frame 72 to swing, is mounted on the right side portion of the lower frame 71. A well-known mechanism is adopted to the driver 53.

The driver 53 is a mechanism that transmits the rotation of an electric motor 54 to a transmission unit. 55 having a worm gear mechanism and causes an adjuster 56 to operate in a vertical direction by power transmitted from the transmission unit 55. The adjuster 56 is a vertically movable member that is connected to the upper frame 72 via a pin 57. Inside the adjuster 56, there are formed screw threads that correspond to the screw threads formed on the outer surface of shaft member.

When the electric motor 54 rotates to cause the shaft member to rotate, the adjuster 56 moves upward or downward. The force of moving the adjuster 56 upward or downward is transmitted to the upper frame 72 via the pin 57. Then the upper frame 72 swings around the right and left second shaft members 52, 52.

The lower frame 71 includes a first lower cross member 73 that extends in a seat width direction between the first shaft members 51 and 51, right and left lower frame side portions 74, 74 that extend upward from both ends of the first lower cross member 73, and a second lower cross member 75 that connects the upper ends of the right and left lower frame side portions 74, 74.

The upper frame 72 includes right and left upper frame side portions 76, 76 that extend upward from upper portions of the right and left lower frame side portions 74, 74, and an upper cross member 77 that connects the upper ends of the right and left upper frame side portions 76, 76.

In the seat back frame 70, the shoulder and back supporting member 40 is a one-piece disposed from an area corresponding to the shoulder of an occupant to an area corresponding to the waist of the occupant. In the shoulder and back supporting member 40, the area located in rear of the waist of the occupant is referred to as a waist pressure receiving portion 41, and the area located in rear of the shoulder of the occupant is referred to as a shoulder pressure receiving portion 42.

Figure 3:
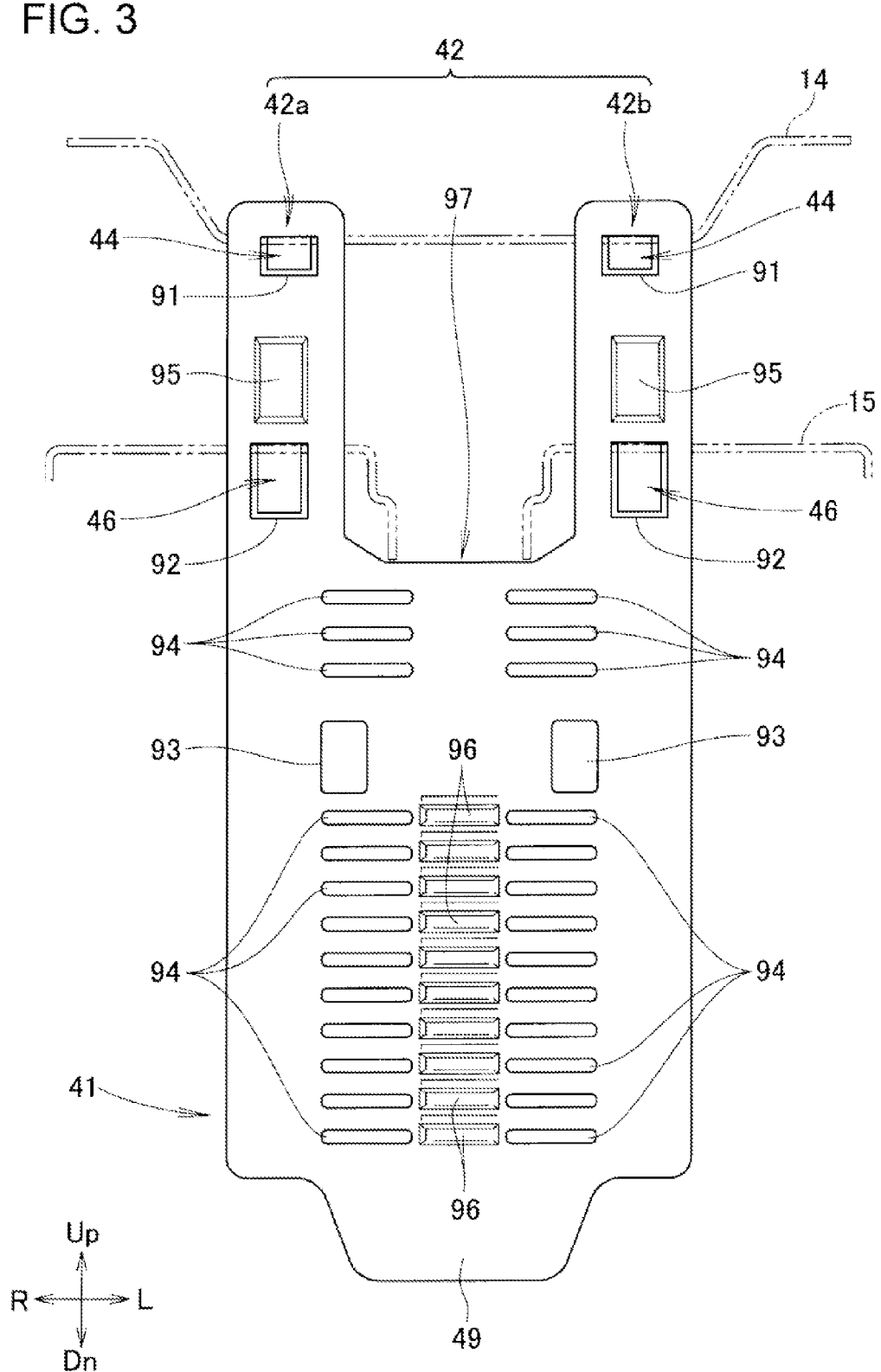
FIG. 3 is a front view of the shoulder and back supporting member illustrated in FIG. 2.
Figure 4:
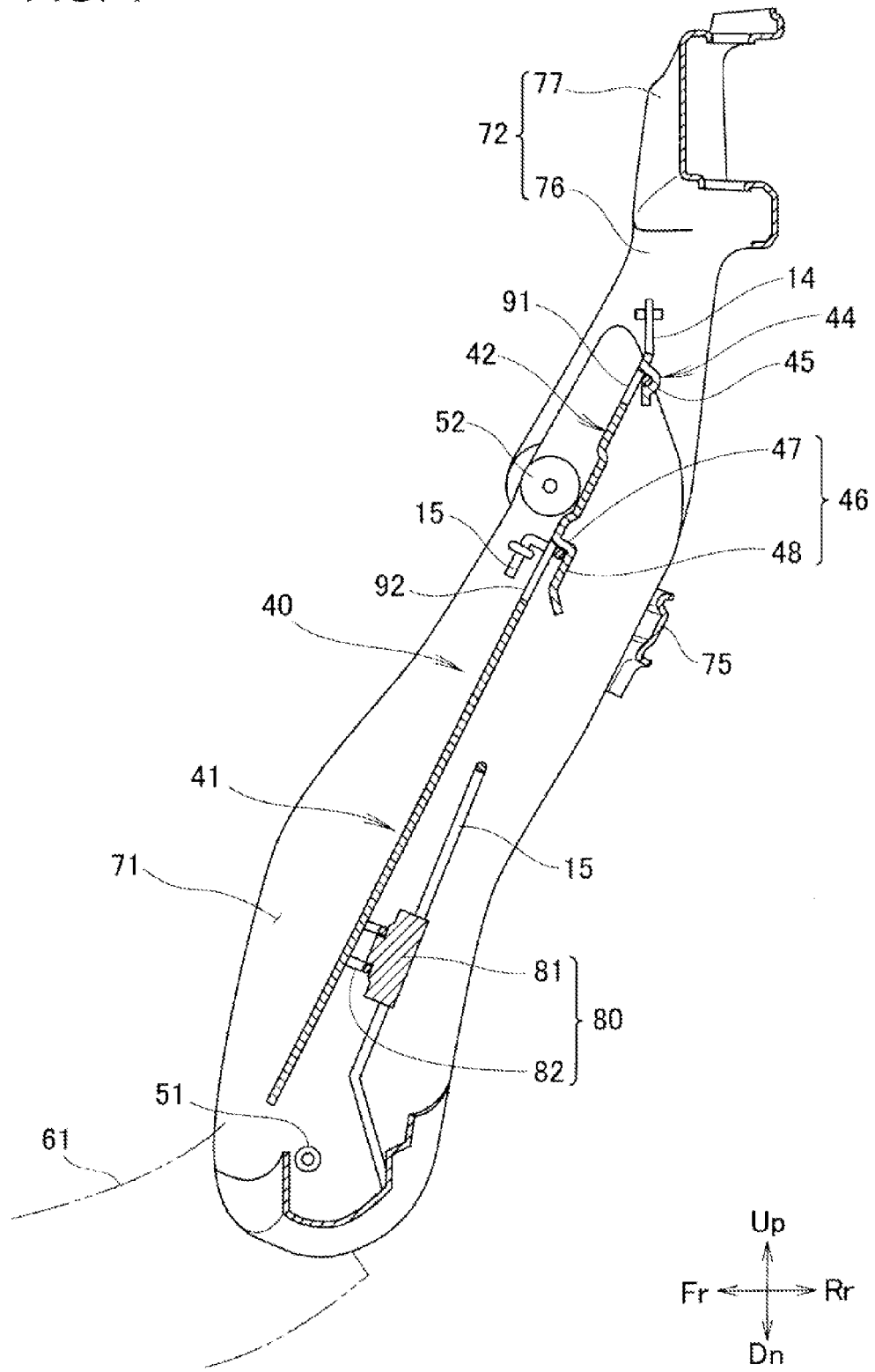
FIG. 4 is a sectional view taken along line IV-IV of FIG. 2.

FIG. 3 and FIG. 4 are collectively referred. A first wire 14 for supporting the upper portion (the shoulder pressure receiving portion 42) of the shoulder and bark supporting member 40 is provided between the right and left upper frame side portions 76 and 76.

The lower frame 71 is provided with a second wire 15 for supporting from a central portion to a lower portion (the waist pressure receiving portion 41) of the shoulder and back supporting member 40. The second wire 15 extends in a seat width direction from the vicinity of the driver 53 provided in the lower frame side portions 74, 74. The second wire 15 is bent downward in a substantially U shape at approximately the center of the seat width. The second wire 15 is supported by the lower frame side portions 74, 74 and the first lower cross member 73.

In the shoulder pressure receiving portion 42, a notch-shaped portion 97 is formed in which the part between the areas corresponding to the right and left shoulder blades of an occupant is cut out. Thus, the shoulder pressure receiving portion 42 includes a right shoulder pressure receiving portion 42a located in rear of the right shoulder blade of an occupant and a left shoulder pressure receiving portion 42b located in rear of the left shoulder blade of an occupant.

A rectangular shaped first hole 91 is formed in the upper end of the right shoulder pressure receiving portion 42a. A retaining portion 44, which is retained by the first wire 14, is formed in rear of the first hole 91. In the retaining portion 44, when seen from the side of the seat back frame 70, a semi-circular shaped ring portion 45 is formed.

Similarly, the upper end of the left shoulder pressure receiving portion 42b is formed. The rectangular shaped first hole 51 is formed in the upper end of the left shoulder pressure receiving portion 42b. The retaining portion 44, which is retained by the first wire 14, is formed in rear of the first hole 91. In the retaining portion 44, when seen from the side of the seat back frame 70, a semi-circular shaped ring portion 45 is formed.

A rectangular shaped second hole 92 is formed in the lower end of the right shoulder pressure receiving portion 42a. A slide portion 46, which slides to be retained by the second wire 15, is formed in rear of the second hole 92. The slide portion 46 includes a vertical portion 47 that extends from the rear surface of the shoulder and back supporting member 40, and a parallel portion 48 that extends downward from the vertical portion 47 parallel to the rear surface of the shoulder and back supporting member 40 and that holds the second wire 15 with the rear surface of the shoulder and back supporting member 40.

Similarly, the lower end portion of the left shoulder pressure receiving portion 42b is formed. A rectangular shaped second hole 92 is formed in the lower end portion of the left shoulder pressure receiving portion 42b. A slide portion 46, which slides to be retained by the second wire 15, is formed in rear of the second hole 92. The slide portion 46 includes a vertical portion 47 that extends from the rear surface of the shoulder and back supporting member 40, and a parallel portion 48 that extends downward from the vertical portion 47 parallel to the rear surface of the shoulder and back supporting member 40 and that holds the second wire 15 with the rear surface of the shoulder and back supporting member 40.

A holding portion 80, which is supported by the lower frame 71, is provided in rear of the waist pressure receiving portion 41. The holding portion 80 includes a holding portion body 81 and a holding wire 82 provided at the end of the holding portion body 81. The rear surface of the shoulder and back supporting member 40 is in contact with the holding wire 82.

FIG. 3 is referred. In each of right and left shoulder pressure receiving portions of the shoulder and back supporting member 40, a first recessed portion 95 is formed between the retaining portion 44 and the slide portion 46.

In the waist pressure receiving portion 41, slits 94 extending in a seat width direction are formed in two rows in a height direction. Second recessed portions 96 extending in a seat width direction are formed between the rows. A projection portion 49, which projects downward, is formed at the lower end of the shoulder and back supporting member 40. Slits 94 and rectangular shaped third holes 93 are formed in the area between the shoulder pressure receiving portion 42 and the waist pressure receiving portion 41.

Figure 5:
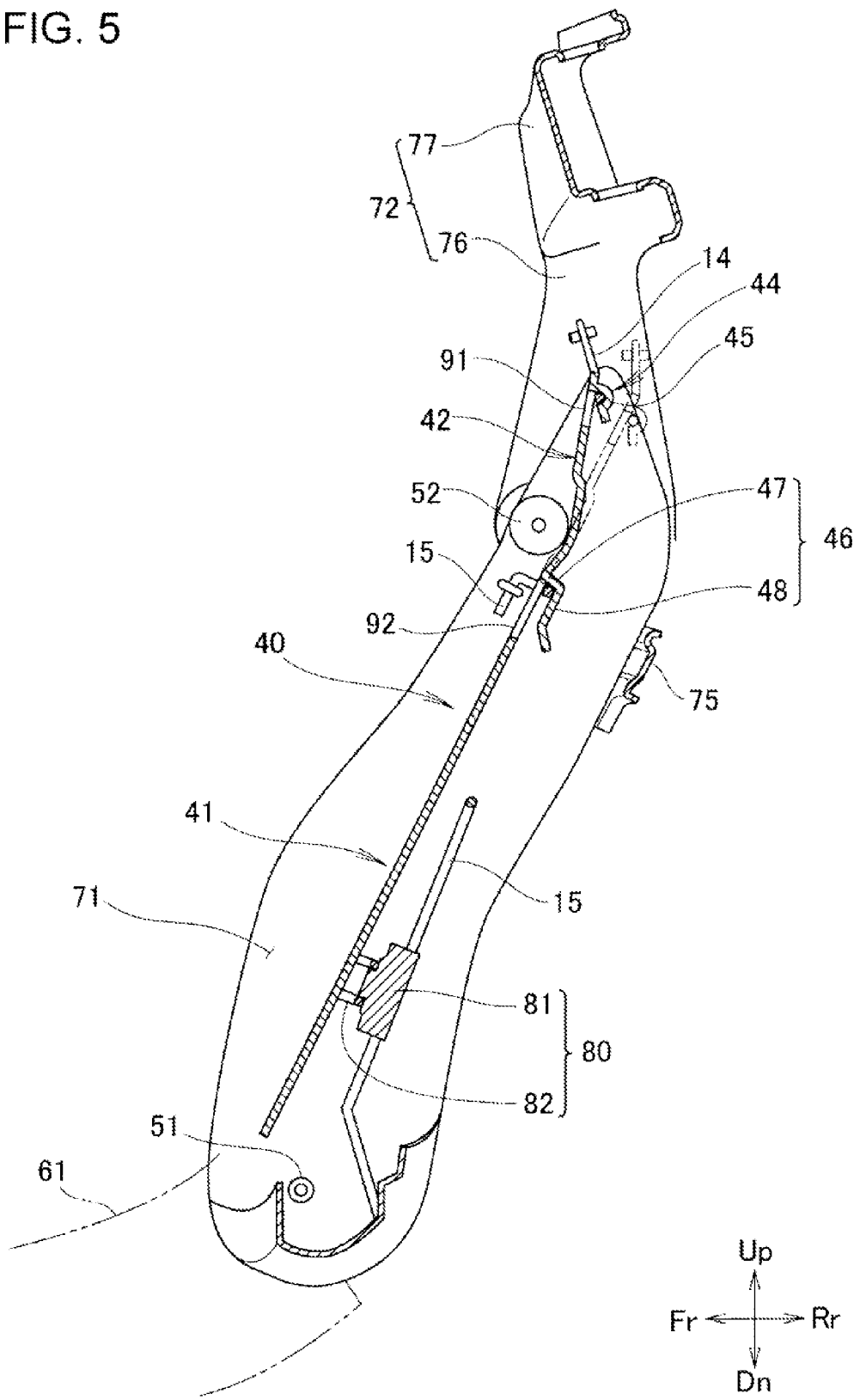
FIG. 5 is a view illustrating the manner in which the shoulder and back supporting member is displaced in coordination with swinging of an upper seat back illustrated in FIG. 4.

Next, the operation and effect of the present disclosure will be described. FIG. 5 is referred. The upper frame 72 is mounted on the upper portion of the lower frame 71 in a forwardly and rearwardly swingable manner via the right and left second shaft members 52, 52. Then the shoulder pressure receiving portion 42 of the shoulder and back supporting member 40 is supported via the first wire 14 by the right and left upper frame side portions 76, 76. Therefore, the shoulder pressure receiving portion 42 may be displaced in coordination with swinging of the upper frame 72.

Figure 6:
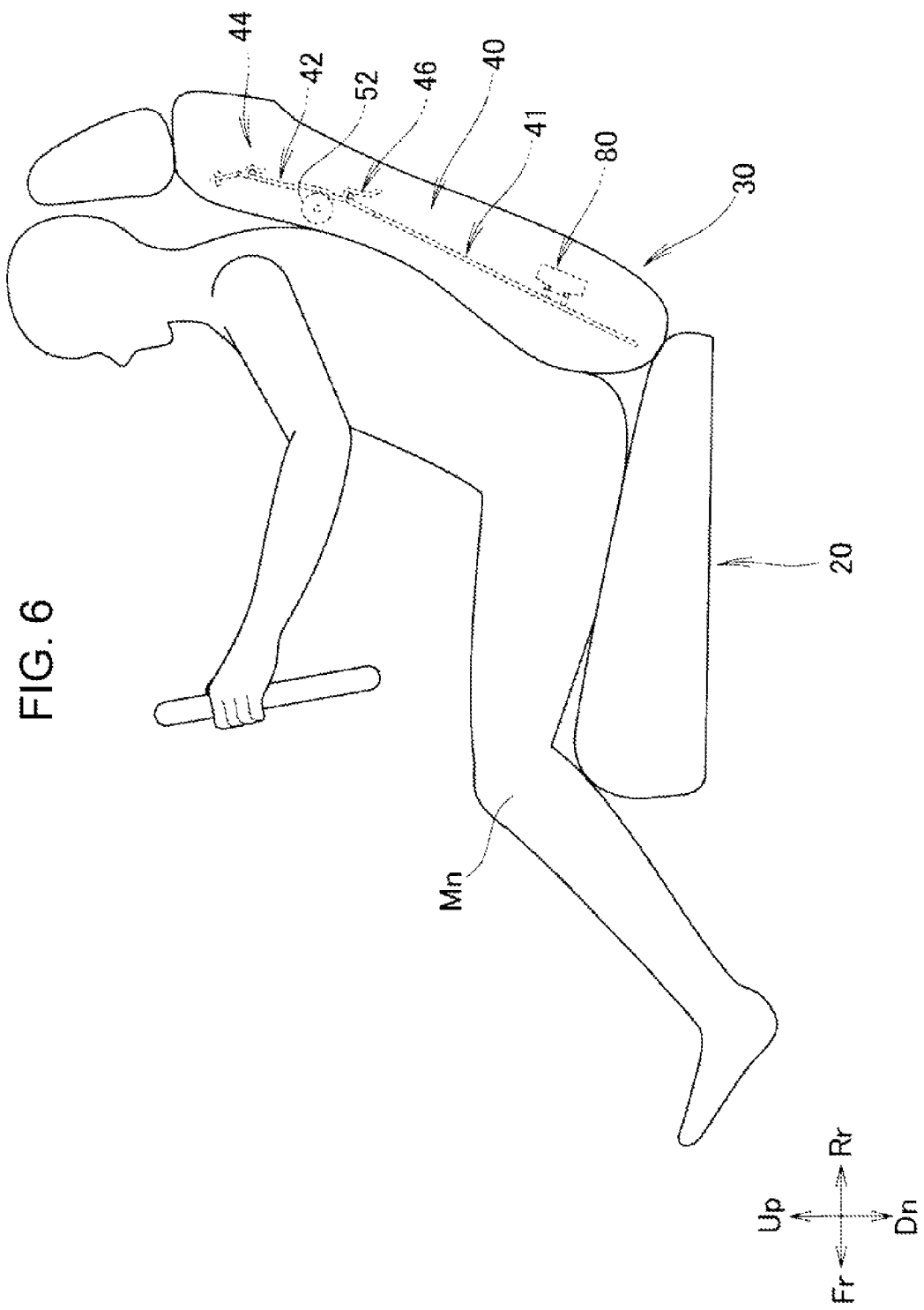
FIG. 6 is an operational view of the seat for vehicles illustrated in FIG. 1.

FIG. 6 is referred collectively. When the upper seat back frame 72 (see FIG. 5) is swung forwardly, the shoulder pressure receiving portion 42 of the shoulder and back supporting member 40 is located closer to the back of occupant Mn. Therefore, the shoulder pressure receiving portion 42 is capable of supporting the shoulder and surrounding of the occupant Mn. Consequently, comfort of the occupant Mn sitting on the seat. 10 for vehicles is enhanced.

Next, the details of displacement of the shoulder and back supporting member 40 when the upper frame 72 is forwardly swung will be described.

Each slide portion 46 of the shoulder and back supporting member 40 is supported by the lower frame 71 via the second wire 15. When the seat back frame 70 is seen from the side, the slide portion 46 is located in the vicinity of the corresponding second shaft member 52. Therefore, when the upper frame 72 is swung forwardly around the second shaft member 52, the shoulder and back supporting member 40 is also bent forwardly around the vicinity of the second shaft member 52. The swing angle of the upper frame 72 and the bending angle of the shoulder and back supporting member 40 are comparable to each other, and thus the shoulder and back supporting member 40 is capable of supporting the occupant Mn according to the body shape of the occupant. Mn. The comfort of the occupant Mn is enhanced.

In addition, the slide portion 46 has the parallel portion 48 that extends parallel to the rear surface of the shoulder and back supporting member 40 and that holds the second wire 15 with the rear surface of the shoulder and back supporting member 40. The holding wire 82 provided at the end of the holding portion body 81 is in contact with the rear surface of the shoulder and back supporting member 40. In other words, the shoulder and back supporting member 40 is not fixed in the slide portion 46 and the holding portion 80. Therefore, the shoulder and back supporting member 40 can be displaced in a height direction of the extending seat of the shoulder and back supporting member 40. Consequently, when the upper frame 72 is swung, the shoulder and back supporting member 40 can be operated smoothly in coordination with the upper frame 72.

FIG. 3 is referred. In the shoulder pressure receiving portion 42 of the shoulder and back supporting member 40, a notch-shaped portion 97 is formed in which the part between the areas corresponding to the right and left shoulder blades is cut out. Therefore, the flexural rigidity of the shoulder pressure receiving portion 42 is lower than the flexural rigidity of the waist pressure receiving portion 41.

The formation of the notch-shaped portion 97 reduces the rigidity of the shoulder pressure receiving portion 42 and coordinated operation of the shoulder and back supporting member 40 with the upper frame 72 (see FIG. 5) is increased. In addition, the shoulder and back supporting member 40 is capable of supporting the shoulder blades which are hard areas in the back of an occupant. The support of the hard areas allows the shoulder and back supporting member 40 to stably support the back of an occupant.

Second Embodiment

Next, a second embodiment of the present disclosure will be described. In the second embodiment, a different configuration is adopted in which a shoulder and back supporting member 40A is supported by the second wire 15. Other configurations are the same as those of the seat 10 for vehicles in the first embodiment, and the same symbols are used description is omitted.

Figure 7:
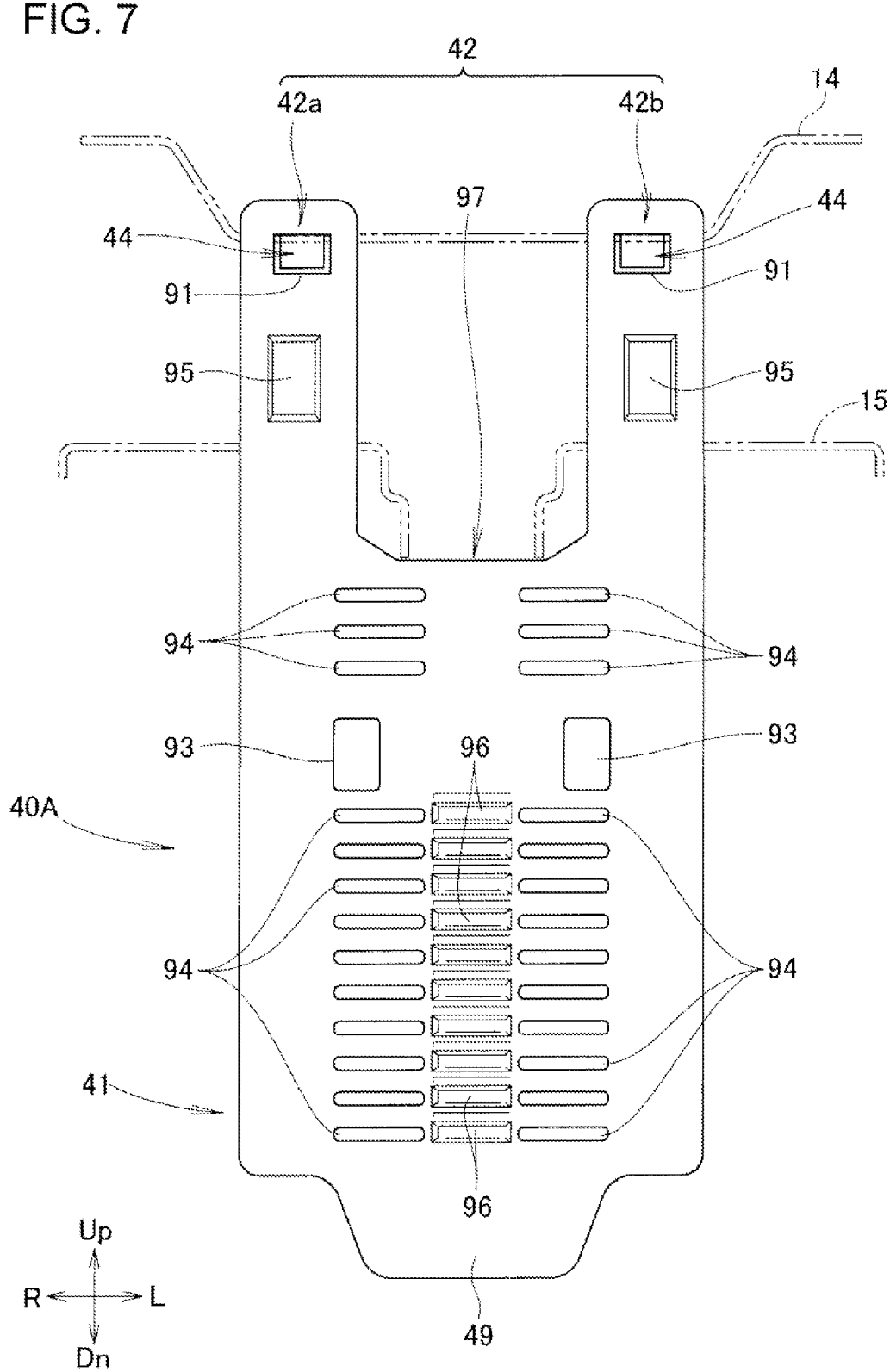
FIG. 7 is a front view of a shoulder and back supporting member of a seat for vehicles according to a second embodiment of the present disclosure.
Figure 8:
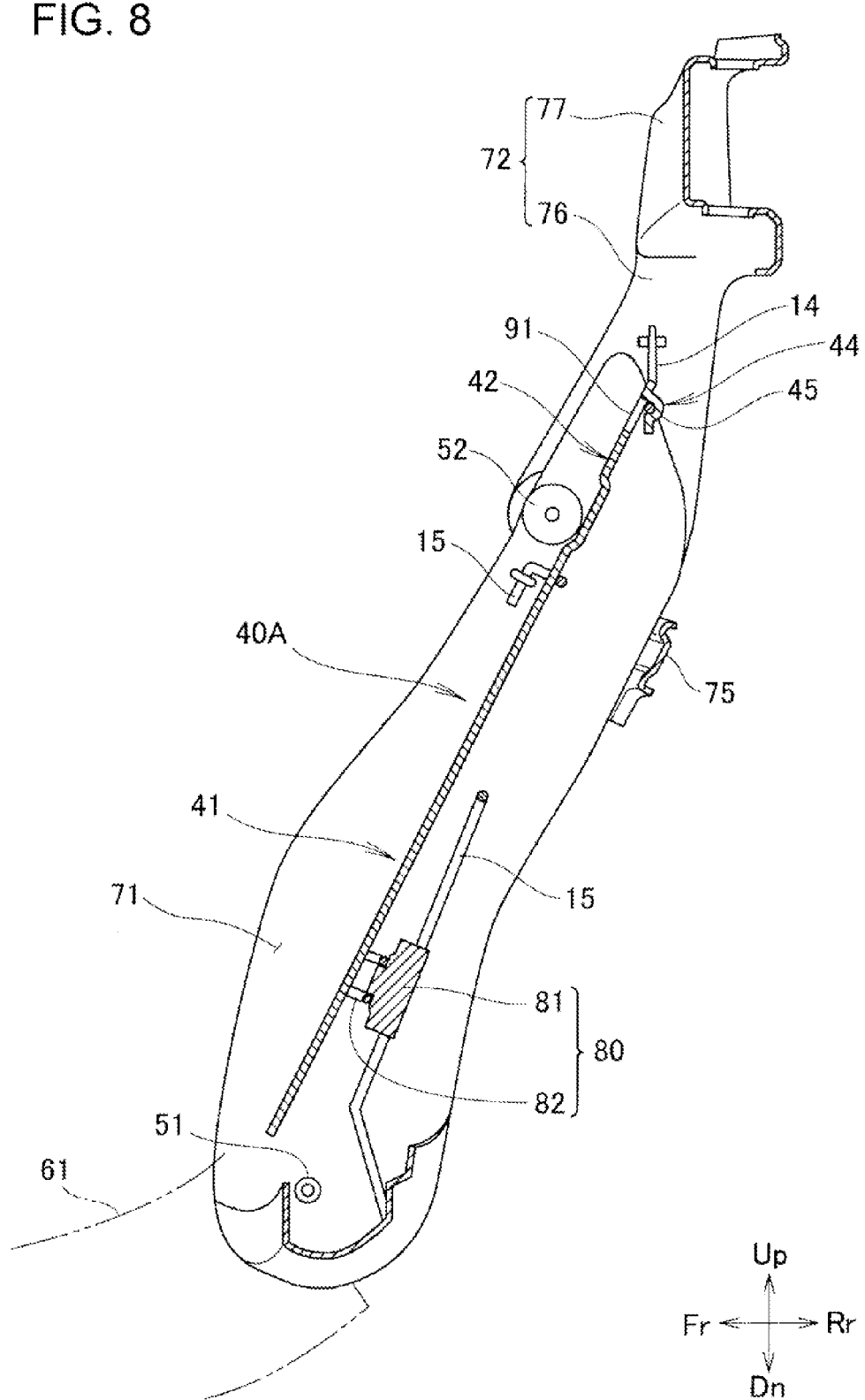
FIG. 8 is a sectional view of the seat for vehicles according to the second embodiment of the present disclosure.

FIG. 7 and FIG. 8 are referred. In the shoulder and back supporting member 40A, the slide portion 46 (see FIG. 3), which slides to be retained by the second wire 15, and the second hole 92 (see FIG. 3) are not formed. The second wire 15 is in contact with the rear surface of the shoulder and back supporting member 40A to support the shoulder and back supporting member 40A. In other words, the retaining area in the shoulder and back supporting member 40A is only the retaining portion 44 that is retained by the first wire 14.

Also in the shoulder and back supporting member 40A, predetermined effect of the present disclosure may be obtained. In addition, with the shoulder and back supporting member 40A, the above-described configuration allows the following distinctive effect to be obtained.

The rear surface of the shoulder and back supporting member 40A is not retained by but in contact with the second wire 15. Therefore, the shoulder and back supporting member 40A is likely to be displaced in a height direction of the seat, and when the upper frame 72 is swung, the shoulder and back supporting member 40A may be bent more smoothly over the area from the shoulder pressure receiving portion 42 to the waist pressure receiving portion 41. Consequently, the shoulder and back supporting member 40A is capable of supporting the occupant Mn according to the body shape thereof. It is more preferable because the comfort of the occupant Mn is further enhanced.

It is to be noted that the second wire 15 may be in non-contact with and be separated from the shoulder and back supporting member 40A. In this case, only the holding portion 80 is the area to be in contact with the shoulder and back supporting member 40A. The shoulder and back supporting member 40A can be bent further smoothly.

The present disclosure is not limited to the embodiments. For instance, the shoulder and back supporting member 40 in the first embodiment and the shoulder and back supporting member 40A in the second embodiment may be flat without forming the third hole 93, the first recessed portion 95, and the second recessed portion 96.

The seat for vehicles in the present disclosure is preferably mounted on a passenger automobile.

What is claimed is:

1. A seat for a vehicle comprising:
   a seat back frame comprising a lower seat back frame and an upper seat back frame that is supported by an upper portion of the lower seat back frame through a pivot axis in such a manner that the upper seat back frame is swingable about the pivot axis forwardly and rearwardly in relation to the lower seat back frame; and
   a shoulder and back supporting member provided to the seat back frame to support the shoulder and back of an occupant in the vehicle, the shoulder and back supporting member having an upper area configured to receive a pressure from the shoulder of the occupant and a lower area configured to receive a pressure from the waist of the occupant,
   wherein the shoulder and back supporting is supported by the upper seat back frame in such a manner that the upper area is swingable along with the upper seat back frame, and
   wherein the upper area extends upwards from a lower side of the pivot axis to an upper side of the pivot axis such that the upper area becomes closer to the back of the occupant so as to support the shoulder and surrounding thereof when the upper area is swung forwardly along with the upper seat back frame.

2. The seat according to claim 1,
   wherein a flexural rigidity of the upper area of the shoulder and back supporting member is lower than a flexural rigidity of the lower area of the shoulder and back supporting member.

3. The seat according to claim 2,
   wherein the upper area of the shoulder and back supporting member comprises a right side support, a left side support, which are configured to support the right and left shoulder blades of the occupant, and a cut-out portion formed between the right support and the left support.

4. The seat according to claim 1, further comprising:
   a holding portion that is supported by the lower seat back frame and is located behind the shoulder and back supporting member, the holding portion being configured to support a rear surface of the shoulder and back supporting member by being contacting with the holding portion.

5. A seat for a vehicle comprising:
   a seat back frame comprising a lower seat back frame and an upper seat back frame that is supported by an upper portion of the lower seat back frame in such a manner that the upper seat back frame is swingable forwardly and rearwardly in relation to the seat back frame, the upper and lower seat back frames being provided with first and second wires, respectively; and
   a shoulder and back supporting member supported by the upper portion of the seat back frame and shaped in a bendable plate having a shoulder pressure receiving portion and a waist pressure receiving portion, thereby supporting an area from a shoulder to a waist of an occupant in the vehicle,
   wherein an upper end of the shoulder pressure receiving portion has a retaining portion engaged with the first wire of the upper seat back frame,
   wherein a lower end of the shoulder pressure receiving portion has a slidably-retaining portion slidably engaged with the second wire of the lower seat back frame, and
   wherein the slidably-retaining portion comprises,
      a vertical portion extending from a back surface of the shoulder pressure receiving portion in a direction perpendicular to the back surface, and
      a parallel portion extending downwardly from the vertical portion in a direction parallel to the back surface of the shoulder pressure receiving portion such that the second wire is held between the parallel portion and the back surface.

6. The seat according to claim 5,
   wherein a flexural rigidity of the shoulder pressure receiving portion is lower than a flexural rigidity of the waist pressure receiving portion.

7. The seat according to claim 5,
   wherein the shoulder pressure receiving portion comprises a right side support, a left side support, which are configured to support the right and left shoulder blades of the occupant, and a cut-out portion formed between the right support and the left support.

8. The seat according to claim 5, further comprising:
a holding portion that is supported by the lower seat back frame and is located behind the shoulder and back supporting member, the holding portion being configured to support a rear surface of the shoulder and back supporting member by being contacting with the holding portion.

9. A seat for a vehicle comprising:
a seat back frame comprising a lower seat back frame and an upper seat back frame that is supported by an upper portion of the lower seat back frame in such a manner that the upper seat back frame is swingable forwardly and rearwardly in relation to the seat back frame, the upper and lower seat back frames being provided with first and second wires, respectively; and
a shoulder and back supporting member supported by the upper portion of the seat back frame and shaped in a bendable plate having a shoulder pressure receiving portion and a waist pressure receiving portion, thereby supporting an area from a shoulder to a waist of an occupant in the vehicle,
wherein an upper end of the shoulder pressure receiving portion has a retaining portion engaged with the first wire of the upper seat back frame, and
wherein a lower end of the shoulder pressure receiving portion has a back surface which contacts the second wire of the lower seat back frame.

10. The seat according to claim 9,
wherein a flexural rigidity of the shoulder pressure receiving portion is lower than a flexural rigidity of the waist pressure receiving portion.

11. The seat according to claim 9,
wherein the shoulder pressure receiving portion comprises a right side support, a left side support, which are configured to support the right and left shoulder blades of the occupant, and a cut-out portion formed between the right support and the left support.

12. The seat according to claim 9, further comprising:
a holding portion that is supported by the lower seat back frame and is located behind the shoulder and back supporting member, the holding portion being configured to support a rear surface of the shoulder and back supporting member by being contacting with the holding portion.

* * * * *